United States Patent
Choi et al.

[11] Patent Number: 6,013,760
[45] Date of Patent: Jan. 11, 2000

[54] SOLUBLE POLYIMIDE RESIN FOR LIQUID CRYSTAL ALIGNMENT LAYER AND PROCESS OF PREPARATION OF THE SAME

[75] Inventors: Kil-Yeong Choi; Mi-Hie Yi; Moon-Young Jin, all of Daejeon; Dae-Woo Ihm, Seoul; Jae-Min Oh, Euiwang-si, all of Rep. of Korea

[73] Assignee: Korea Research Institute of Chemical Technology, Daejeon, Rep. of Korea

[21] Appl. No.: 09/086,385

[22] Filed: May 29, 1998

[30] Foreign Application Priority Data

May 29, 1997 [KR] Rep. of Korea ............. 97-21578

[51] Int. Cl.[7] .................... C08G 73/10; C08G 69/28
[52] U.S. Cl. ................. 528/353; 528/125; 528/128; 528/171; 528/172; 528/173; 528/174; 528/175; 528/179; 528/183; 528/185; 528/188; 528/220; 528/229; 528/350; 428/473.5
[58] Field of Search ................ 528/125, 128, 528/171, 172, 173, 174, 175, 179, 183, 185, 188, 220, 229, 350, 353; 428/473.5

[56] References Cited

U.S. PATENT DOCUMENTS

| | | | |
|---|---|---|---|
| 5,521,276 | 5/1996 | Choi et al. | 528/322 |
| 5,610,265 | 3/1997 | Tan | 528/353 |
| 5,614,606 | 3/1997 | Chaudhari et al. | 528/353 |
| 5,686,558 | 11/1997 | Kitamura et al. | 528/353 |
| 5,731,404 | 3/1998 | Auman et al. | 528/125 |
| 5,783,656 | 7/1998 | Kimura et al. | 528/353 |
| 5,807,961 | 9/1998 | Sawai et al. | 528/170 |

*Primary Examiner*—P. Hampton-Hightower
*Attorney, Agent, or Firm*—Finnegan, Henderson, Farabow, Garrett & Dunner, L.L.P

[57] ABSTRACT

The invention herein relates to a soluble polyimide resin for a liquid crystal alignment layer and the process of preparation of the same, wherein aliphatic tetracarboxylic dianhydride and aromatic diamine having the amide group are used to yield a novel form of a polyimide resin having superior heat-resistance, solubility, transparency, and liquid crystal alignment capacity.

More specifically, the invention herein relates to a novel polyimide resin having excellent heat-resistance, solubility, liquid crystal alignment property, and high pretilt angle, which is prepared by means of jointly using the aromatic diamine, used for the preparation of the conventional polyimide resin, and the aromatic diamine having a long alkyl chain with a substituted amide group, and reacting the same with various types of carboxylic dianhydride.

7 Claims, No Drawings

SOLUBLE POLYIMIDE RESIN FOR LIQUID CRYSTAL ALIGNMENT LAYER AND PROCESS OF PREPARATION OF THE SAME

FIELD OF THE INVENTION

The invention herein relates to a soluble polyimide resin for liquid alignment layer and the process of preparation of the same, wherein aliphatic tetracarboxylic dianhydride and aromatic diamine are used to yield a novel form of a polyimide resin having the repetitive unit of the formula 1 as below, which has superior heat-resistance, solubility, transparency, and liquid crystal alignment capacity:

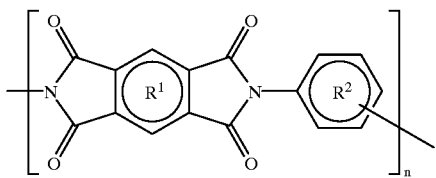
(1)

wherein:

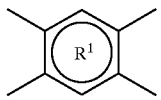

must include

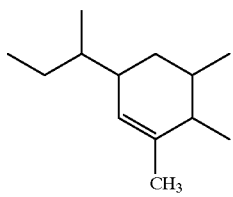

and contains one or more groups selected from the following tetravalent groups,

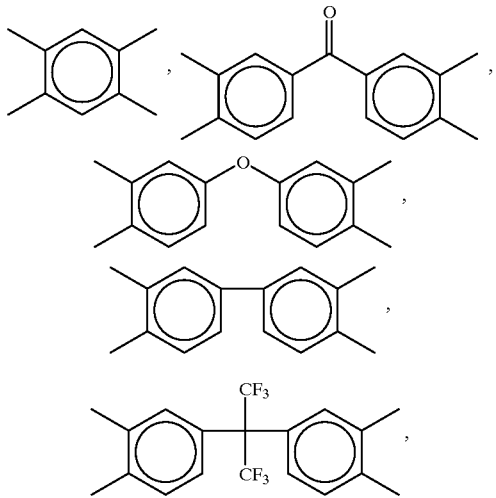

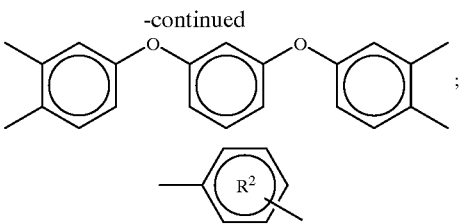

must include one or more of 3,5-diaminobenzamide derivatives having various side chains as represented by

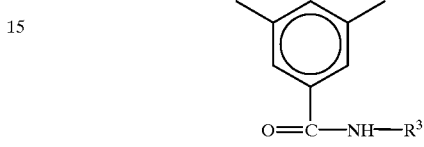

and may contain the following bivalent groups,

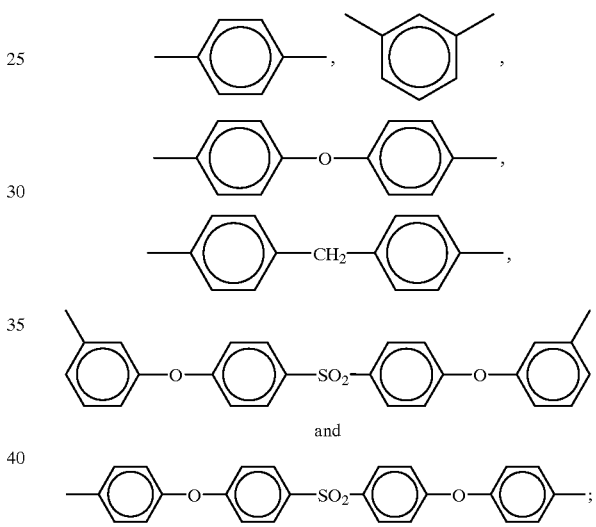

wherein, $R^3$ represents $-(CH_2)_n-CH_3$ or 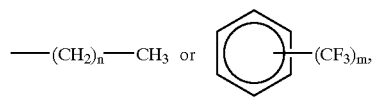$-(CF_3)_m$, n is an integer between 3 to 17, and
m is 1 or 2.

BACKGROUND OF THE INVENTION

In general, a polyimide(hereinafter referred to as "PI") resin denotes a high heat-resistant resin which is manufactured by condensation polymerization of aromatic tetracarboxylic acid or the derivatives thereof with aromatic diamine, or aromatic diisocyanate followed by imidization. However, the PI resin is insoluble in solvent and non-meltable by heat.

Further, the PI resin can have a variety of molecular structures depending on the types of the monomers thereof. As for the aromatic tetracarboxylic acid constituent, pyromellitic dianhydride(PMDA) or biphenyltetracarboxylic dianhydride(BPDA) are used herein. As for the aromatic diamine constituent, oxydianiline(ODA) or p-phenylene diamine(p-PDA) are used for condensation polymerization. The typical PI resin has a repetitive unit of the following formula 10:

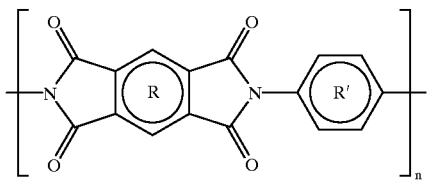

The PI resin with the formula 10 as repetitive unit is high heat-resistant, insoluble, and non-meltable with the following properties:

(1) excellent heat-resistance oxidation property;
(2) superior heat-resistance based on the utilization at high temperature, i.e., 260° C. for a long-term use, and 480° C. for a short-term use;
(3) excellent electrochemical and mechanical properties;
(4) excellent radiation resistance and low temperature properties;
(5) intrinsic non-combustible properties; and,
(6) excellent chemicals-resistant properties.

In spite of the fact that the PI resin with formula 10 as repetitive unit possesses an excellent heat resistance property, the processing therein is extremely difficult due to insolubility and non-melting property.

To overcome the shortcomings of the PI resin, several methods have been devised: a) method of introducing polar groups into the backbone or side chains of the polymer, b) method of introducing the connecting groups or pendant groups with a large volume into the polymer, and c) method of enhancing the flexibility of the backbone of the polymer.

In particular, as part of research to enhance the solubility of the PI resin, T. Kurosaki et al. reported a method of preparing a soluble PI using alicyclic anhydride as a monomer(Macromolecules, 1994, 27, 1117 and 1993, 26, 4961). Also, Qn Jin et al. disclosed in 1993 a method of preparing a soluble PI resin using the cyclic diamine(J.P.S. Part A. Polym. Chem. Ed., 31, 2345~2351).

In the present invention, the mixture of dioxotetrahydrofuryl 3-methylcyclohexene-1,2-dicarboxylic dianhydride (DOCDA) and aromatic tetracarboxylic dianhydride for the carboxylic acid constituent to prepare the novel soluble polyimides was used. The mixture therefrom undergoes poly-condensation reaction with the mixture of 3,5-diaminobenzamide derivatives having various side chain and the conventional aromatic diamines. Using the process as above, the invention herein has been so devised.

Consequently, the invention herein has a superior heat-resistance, optical transparency, solubility, processability while maintaining the basic characteristics of the conventional PI. As such, the invention herein can be used as core heat-resistance material in the advanced electronics and aerospace industries. Further, the objective of the invention lies in providing a novel PI resin having a liquid crystal alignment property for the application of TFT-LCD liquid crystal alignment layer.

DETAILED DESCRIPTION OF PREFERRED EMBODIMENTS

The present invention relates to a polyimide resin comprising the following formula 1 as repetitive unit:

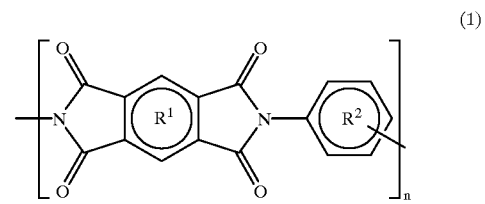

wherein:

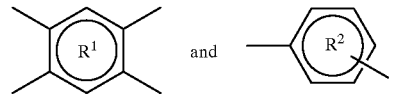

have been previously defined.

Further, the invention herein relates to a process of manufacturing a polyimide resin having aforementioned formula 1 as repetitive unit, derived from a solution polymerization of tetracarboxylic dianhydride and aromatic diamine compounds.

With respect to the above manufacturing process, said tetracarboxylic dianhydride consists essentially of dioxotetrahydrofuryl 3-methylcyclohexene-1,2-dicarboxylic dianhydride of formula 2 and includes one or more aromatic tetracarboxylic acids of the following group consisting of pyromellitic dianhydride(PMDA), benzophenonetetraboxylic dianhydride(BTDA), oxydiphthalic dianhydride(ODPA), biphenyltetracarboxylic dianhydride(BPDA), hexafluoroisopropylidene diphthalic dianhydride(HFDA), and hydroquinonebisphthalic dianhydride(HQDPA).

As for said diamine compound, it consists essentially of one or more of 3,5-diamino benzamide derivatives having various side chains as expressed by formula 3 and a mixture having one or more of diamine compounds selected from the group consisting of oxydianiline, methylene dianiline, metabisaminophenoxy diphenylsullone, and parabisaminophenoxy diphenylsulfone.

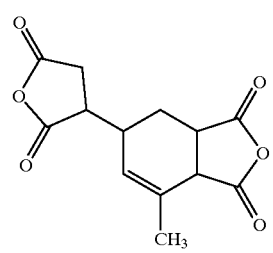

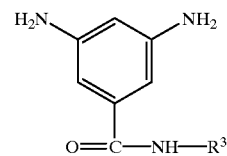

wherein: R³ represents

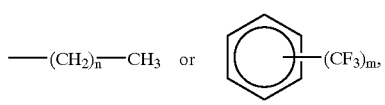

n is an integer between 3 to 17, and m is 1 or 2.

The invention herein is explained in more detail as set forth hereunder. The invention relates to a PI resin having formula 1 as repetitive unit and the process of preparation of the same, wherein tetracarboxylic dianhydride consisting essentially of dioxotetrahydrofuryl 3-methylcyclohexene-1,2-dicarboxylic dianhydride of formula 2, and the 3,5-diamino benzamide derivatives having various side chains as expressed by formula 3.

The PI resin of the invention herein has a weight average molecular weight(MW) of about 50,000~150,000 g/mol. The inherent viscosity thereof is in the range of 0.5~2.0 dL/g. The glass transition temperature(Tg) thereof is in the range of 250~400° C. Also, the PI resin under said invention is easily dissolvable at room temperature not only in aprotic polar solvents such as dimethylacetamide(DMAc), dimethylformamide(DMF), N-methyl-2-pyrrolidone(NMP), but also in organic solvents such as acetone, ethyl acetate, m-cresol. At room temperature, it demonstrates a high solubility of more than 10 wt % in a solution having a low boiling point, such as tetrahydrofuran(THF) and chloroform, and in a low water absorptive solvent such as γ-butyrolactone.

The following examples illustrate various aspects of the invention herein but are not to be construed to limit the claims in any manner whatsoever.

Preparation Example 1

Preparation of 3,5-dinitro-n-butyl-benzamide

To a 50 ml reactor equipped with an agitator, thermometer, nitrogen-inlet, dropping funnel and condenser, nitrogen gas was slowly influxed as n-butylamine(0.73 g, 0.01 mole) was dissolved in 5 ml of the reacting solvent of dimethylacetamide(hereinafter referred to as "DMAc"). While influxing nitrogen gas, 3,5-dinitrobenzoyl chloride (2.30 g, 0.01 mole) was slowly added. After the reaction, the mixture was precipitated in excess water. Thereafter, the solid material so filtered was repetitively washed with sodium bicarbonate and dil. hydrochloric acid solutions, after which was dried under reduced pressure. Using the process as set forth above, the 3,5-dinitro-n-butyl-benzamide(DN-L-4AM) was prepared with the reaction yield of 91%.

Preparation Example 2

3,5-diamino-n-butyl-benzamide 3,5-Dinitro-n-butyl-benzamide(10.7 g, 0.04 mole) was dissolved in 200 ml of ethanol, after which was placed in a hydrogenator along with 2.0 g of 5% Pd/C As such, the reduction reaction was carried out at 40° C. for 3 hours. After filtering of the reacted mixture, the solvent so reacted was distilled under reduced pressure. The mixture was re-crystallized under ethyl acetate/hexane co-solvent to yield 3,5-diamino-n-butyl-benzamide(DA-L-4AM) with the reaction yield of 96%.

Further, using the same process as in preparation example 1 and 2, the diamine compounds as shown in Table 1 were prepared.

TABLE 1

| Diamine Compound | Structure | Yield (%) | Melting Point (° C.) |
|---|---|---|---|
| DA-L-4AM | ![structure with C4H9] | 84.0 | 87.0 |
| DA-L-6AM | ![structure with C6H13] | 80.0 | 104.1 |
| DA-L-8AM | ![structure with C8H17] | 82.0 | 93.0~94.0 |

TABLE 1-continued

| Diamine Compound | Structure | Yield (%) | Melting Point (° C.) |
|---|---|---|---|
| DA-L-10AM | 3,5-diamino-N-decylbenzamide | 80.7 | 95.0 |
| DA-L-12AM | 3,5-diamino-N-dodecylbenzamide | 82.0 | 92.2, 116.4 |
| DA-L-14AM | 3,5-diamino-N-tetradecylbenzamide | 85.4 | 91.0 |
| DA-L-16AM | 3,5-diamino-N-hexadecylbenzamide | 80.9 | 92.0, 115.9 |
| DA-L-18AM | 3,5-diamino-N-octadecylbenzamide | 81.0 | 54.5, 121.7 |
| DA-L-3FAM | 3,5-diamino-N-(3-trifluoromethylphenyl)benzamide | 95.3 | 193.0 |
| DA-L-4FAM | 3,5-diamino-N-(4-trifluoromethylphenyl)benzamide | 96.0 | 192.0 |

As shown in Table 1, the diamine compound having various side chains connected with the amide group such as DA-L-nAM, or DA-L-nFAM, could be prepared with a relatively high yield in the range of above 80% after re-crystallization. There was a tendency of reduction in yield as the length of the substituted alkyl chain became longer.

The diamine compound having trifluoromethyl group, such as DA-L-nFAM showed a very high melting point.

Further, the structure of the diamine compound so prepared was confirmed by using the nuclear magnetic resonance method, and the example of such $^1$H-NMR is shown in FIG. 1 as DA-L-10AM.

EXAMPLE 1

To a 50 ml reactor equipped with an agitator, thermometer, nitrogen-inlet. dropping funnel and condenser, nitrogen gas was slowly influxed as p-phenylene diamine (p-PDA: 9.72 g, 0.09 mole) and modified diamine 3,5-diamino-n-butyl-benzamide(DA-L-4AM: 2.07 g, 0.01 mole) were dissolved in the reaction solvent of m-cresol. Thereafter, while influxing the nitrogen gas, dioxotetrahydrofuryl 3-methylcyclohexene-1,2-dicarboxylic dianhydride (DOCDA: 26.4 g, 0.1 mole) in solid phase was slowly added therein. At this point, the solid content was set at 15 wt %, and the reaction temperature was raised to 70° C., after which the reaction was carried out for 2 hours. The temperature was successively raised to the reflux temperature, after which the mixture was stirred for 6~12 hours. As an imidization catalyst, iso-quinoline(1~5 wt %) was used. After the reaction, the mixture was precipitated using the waring blender in excess methanol (MeOH hereinafter). The filtered polymer was washed with water and MeOH several times and was dried under reduced pressure at 120° C. to yield a novel PI resin(hereinafter referred to as "P-1"). The yield of polymerization was quantitative in nature. The inherent viscosity measured at 30° C. at the concentration of 0.5 g/dL was 0.58 dL/g in the presence of m-cresol as a solvent.

EXAMPLE 2 p-PDA(9.72 g, 0.09 mole), DA-L-6AM(2.35 g, 0.01 mole), and DOCDA(26.4 g, 0.1 mole) were dissolved in m-cresol, after which the PI resin(P-2 hereinafter) was prepared using the same method as in above Example 1. The PI resin, so prepared, was dissolved in m-cresol at the concentration of 0.5 g/dL, and the inherent viscosity measured at 30° C. was 0.67 dL/g.

EXAMPLE 3 p-PDA(9.72 g, 0.09 mole), DA-L-6AM(2.63 g, 0.01 mole), and DOCDA(26.4 g, 0.1 mole) were dissolved in m-cresol, after which the PI resin(P-3 hereinafter) was prepared using the same method in above Example 1. The PI resin, so prepared, was dissolved in m-cresol at the concentration of 0.5 g/dL, and the inherent viscosity measured at 30° C. was 0.50 dL/g.

EXAMPLE 4 p-PDA(9.72 g, 0.09 mole), DA-L-10AM(2.91 g, 0.01 mole), and DOCDA(26.4 g, 0.1 mole) were dissolved in m-cresol, after which the PI resin(P-4 hereinafter) was prepared using the same method in above Example 1. The PI resin, so prepared, was dissolved in m-cresol at the concentration of 0.5 g/dL, and the inherent viscosity measured at 30° C. was 0.76 dL/g.

EXAMPLE 5 p-PDA(9.72 g, 0.09 mole), DA-L-12AM(3.19 g, 0.01 mole), and DOCDA(26.4 g, 0.1 mole) were dissolved in m-cresol, after which the PI resin(P-5 hereinafter) was prepared using the same method in above Example 1. The PI resin, so prepared, was dissolved in m-cresol at the concentration of 0.5 g/dL, and the inherent viscosity measured at 30° C. was 0.82 dL/g.

EXAMPLE 6 p-PDA(9.72 g, 0.09 mole), DA-L-14AM(3.47 g, 0.01 mole), and DOCDA(26.4 g, 0.1 mole) were dissolved in m-cresol, after which the PI resin(P-6 hereinafter) was prepared using the same method in above Example 1. The PI resin, so prepared, was dissolved in m-cresol at the concentration of 0.5 g/dL, and the inherent viscosity measured at 30° C. was 0.80 dL/g.

EXAMPLE 7 p-PDA(9.72 g, 0.09 mole), DA-L-16AM(3.75 g, 0.01 mole), and DOCDA(26.4 g, 0.1 mole) were dissolved in m-cresol, after which the PI resin(P-7 hereinafter) was prepared using the same method in above Example 1. The PI resin, so prepared, was dissolved in m-cresol at the concentration of 0.5 g/dL, and the inherent viscosity measured at 30° C. was 0.53 dL/g.

EXAMPLE 8 p-PDA(9.72 g, 0.09 mole), DA-L-18AM(4.03 g, 0.01 mole), and DOCDA(26.4 g, 0.1 mole) were dissolved in m-cresol, after which the PI resin(P-8 hereinafter) was prepared using the same method in above Example 1. The PI resin, so prepared, was dissolved in m-cresol at the concentration of 0.5 g/dL, and the inherent viscosity measured at 30° C. was 0.89 dL/g.

EXAMPLE 9 p-PDA(9.72 g, 0.09 mole), DA-L-3FAM(2.95 g, 0.01 mole), and DOCDA(26.4 g, 0.1 mole) were dissolved in m-cresol, after which the PI resin(P-9 hereinafter) was prepared using the same method in above Example 1. The PI resin, so prepared, was dissolved in m-cresol at the concentration of 0.5 g/dL, and the inherent viscosity measured at 30° C. was 1.02 dL/g.

EXAMPLE 10 p-PDA(9.72 g, 0.09 mole), DA-L-4FAM(2.95 g, 0.01 mole), and DOCDA(26.4 g, 0.1 mole) were dissolved in m-cresol, after which the PI resin(P-10 hereinafter) was prepared using the same method in above Example 1. The PI resin, so prepared, was dissolved in m-cresol at the concentration of 0.5 g/dL, and the inherent viscosity measured at 30° C. was 1.10 dL/g.

EXAMPLE 11 p-PDA(9.72 g, 0.09 mole) and (DA-L-4AM: 2.07 g, 0.01 mole) were dissolved in m-cresol. Thereafter, while influxing the nitrogen gas, dioxotetrahydrofuryl 3-methylcyclohexene- 1,2-dicarboxylic dianhydride (DOCDA: 23.8 g, 0.09 mole) and pyromellitic dianhydride (PMDA, 2.18 g, 0.01 mol) in solid phase was slowly added therein, after which the PI resin(P-11 hereinafter) was prepared using the same method in above Example 1. The soluble PI resin, so prepared, was dissolved in m-cresol at the concentration of 0.5 g/dL, and the inherent viscosity measured at 30° C. was 1.30 dL/g.

Comparative Example

The same process is used as in above Example 1 except that the PI resin(hereinafter P-12) was synthesized via the reaction of p-PDA(1.08 g, 0.01 mole) and DOCDA(26.4 g, 0.1 mole). The PI resin, so prepared, was dissolved in m-cresol at the concentration of 0.5 g/dL, and the inherent viscosity measured at 30° C. was 1.31 dL/g.

Experimental Example 1
Measurements of Inherent Viscosity, Glass Transition Temperature, and Film Plasticity The results measurements of inherent viscosity, glass transition temperature, and film plasticity of the PI reins prepared in above examples 1~11 are shown in Table 2. The glass transition temperature was measured by using differential scanning calorimeter(DSC) under nitrogen atmosphere. In particular, the measurement was made from the secondary thermal traces of the DSC measurements so transferred while raising the temperature at 10° C./min.

TABLE 2

| Polymer | Inherent Viscosity (dL/g) | Glass Transition Temperature (° C.) | Film Property |
|---|---|---|---|
| Example 1 (P-1) | 0.58 | 326 | Tough |
| Example 2 (P-2) | 0.67 | 322 | Tough |
| Bxample 3 (P-3) | 0.50 | 334 | Tough |
| Example 4 (P-4) | 0.76 | 314 | Tough |
| Example 5 (P-5) | 0.82 | 332 | Tough |
| Example 6 (P-6) | 0.80 | 312 | Tough |
| Example 7 (P-7) | 0.53 | 296 | Tough |
| Example 8 (P-8) | 0.89 | 297 | Tough |
| Example 9 (P-9) | 1.02 | 352 | Tough |
| Example 10 (P-10) | 1.10 | 345 | Tough |
| Example 11 (P-11) | 1.30 | 335 | Tough |
| Comp. Exp. (P-11) | 1.31 | 330 | Tough |

As shown in Table 2, the PI resins prepared in the examples 1~11 were all amorphous and transparent. The polymers of high molecular weight with the inherent viscosity as measured by m-cresol were obtained. The polymers herein showed a high glass transition temperature of above 290° C.($T_g$) albeit discrepancies depending on the length of alkyl substitutent of the modified diamine. Further, the film plasticity thereof seemed to be excellent. In other words, the PI resins prepared from DOCDA or the mixture of DOCDA and aromatic dianhydrides could so become polyimides with high molecular weight by one-step polyimidization at high temperature.

On the other hand, the PI resin prepared in the comparative example did not include modified diamine but had a relatively high molecular weight with the inherent viscosity of 1.31 dL/g in addition to having a superior film plasticity.

Experimental Example 2
Liquid Crystal Alignment Property

The liquid crystal cells were fabricated by two transparent conductive glasses covered by spin-coating the PI solution in γ-butyrolactone. The surface of the alignment film was rubbed with nylon fabrics four times before the assembling cell. The characteristics of such liquid cells are shown in Table 3. The alignment state of the liquid crystals were examined by a microscope with cross-polarizer, and the pretilt angles were measured by the crystal rotation method.

TABLE 3

| Polymer | Liquid Crystal Alignment Property | Pretilt Angle (°) |
|---|---|---|
| Example 1 (P-1) | Good | 3.5 |
| Example 2 (P-2) | Good | 5.4 |
| Example 3 (P-3) | Good | 4.3 |
| Example 4 (P-4) | Good | 4.7 |
| Example 5 (P-5) | Good | 3.9 |
| Example 6 (P-6) | Good | 3.6 |
| Example 7 (P-7) | Good | 6.1 |
| Example 8 (P-8) | Good | 4.3 |
| Example 9 (P-9) | Good | 10.5 |
| Example 10 (P-10) | Good | 12.1 |
| Example 11 (P-11) | Good | 6.0 |

As shown in Table 3, the novel PI liquid crystal alignment layer exhibited a superior liquid crystal alignment property and stable pretilt angles. Further, said layer with the pretilt angle of 1°~15° had appropriate characteristics for AM TFT-LCD.

The PI resin under the present invention not only has superior heat-resistance but also excellent solubility and transparency, which could be applicable as material for various advanced heat-resistance material and the liquid crystal alignment layer for AM TFT-LCD.

What is claimed is:

1. A polyimide resin having the following formula (1) as a repetitive unit:

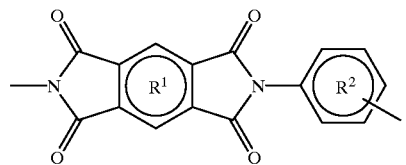

(1)

wherein:

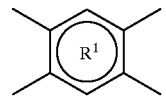

must include

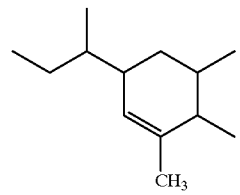

and contains a tetravalent group selected from the group consisting of

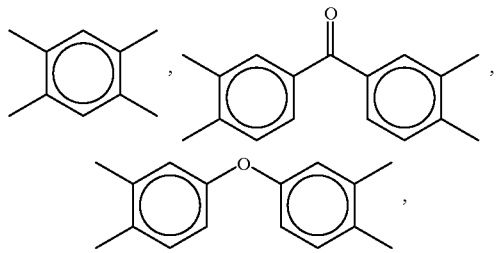

-continued

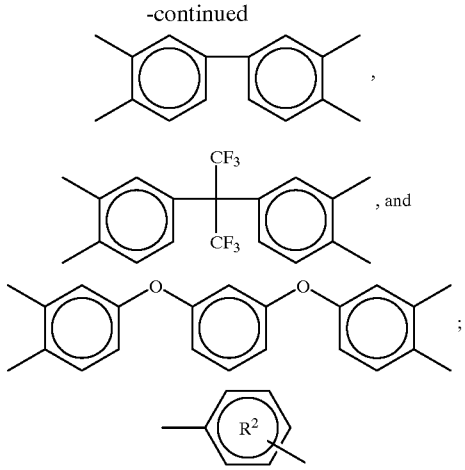

must include a 3,5-diaminobenzamide derivative as represented by

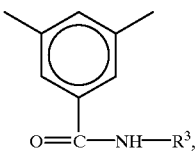

and optionally contains the following bivalent groups,

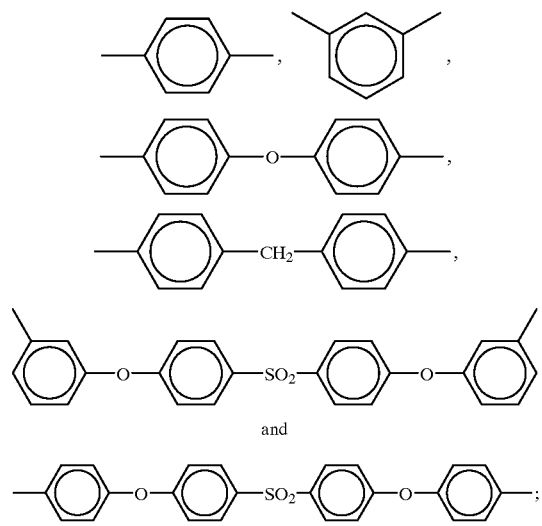

wherein, $R^3$ represents

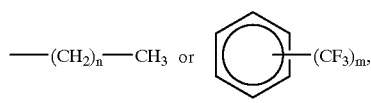

n is an integer between 3 and 17, and
m is 1 or 2.

2. A polyimide resin according to claim 1, wherein the inherent viscosity of said polyimide resin is in the range of 0.5~2.0 dL/g.

3. A polyimide resin according to claim 1, wherein the average molecular weight of said polyimide resin is in the range of 50,000~150,000 g/mol.

4. A polyimide resin according to claim 1, wherein the glass transition temperature of said polyimide resin is in the range of 250~400° C.

5. A polyimide resin according to claim 1, wherein the pretilt angle of said polyimide resin is in the range of 1°~15°.

6. A polyimide resin according to claim 1, wherein said polyimide resin is soluble at room temperature in a solvent or co-solvent selected from the group consisting of dimethylacetamide, dimethylformamide, N-methyl-2-pyrrolidone, acetone, ethyl acetate, tetrahydrofuran, chloroform, m-cresol, and γ-butyrolactone.

7. A process of preparing a polyimide resin having formula (1) as a repetitive unit by means of solution polymerization of a tetracarboxylic dianhydride and a diamine compound,

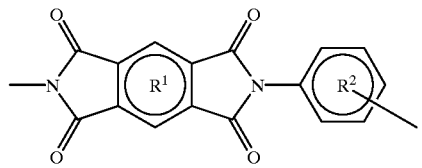

(1)

wherein

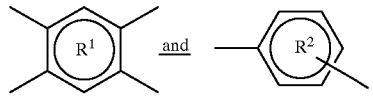

are as defined in claim 1, and wherein said tetracarboxylic dianhydride consists essentially of dioxotetrahydrofuryl 3-methylcyclohexan-1,2-dicarboxylic acid of formula (2)

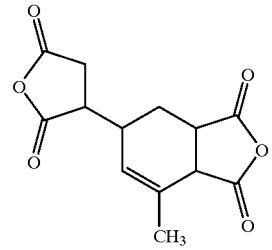

(2)

and optionally includes an aromatic tetracarboxylic acid selected from the group consisting of pyromellitic dianhydride (PMDA), benzophenonetetraboxylic dianhydride (BTDA), oxydiphthalic dianhydride (ODPA), biphenyltetracarboxylic dianhydride (BPDA), hexafluorisopropylidene diphthalic dianhydride (HFDA), and hydroquinonebisphthalic dianhydride (HQDPA); and said diamine compound consists essentially of a 3,5-diaminobenzamide derivative of formula (3)

(3) 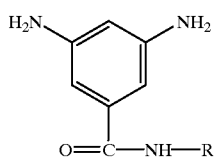
and a diamine compound selected from the group consisting of oxydianiline, methylene dianiline, metabisaminophenoxy diphenylsulfone, and parabisaminophenoxy diphenylsulfone.
* * * * *